US012093757B2

(12) United States Patent
Nanda et al.

(10) Patent No.: US 12,093,757 B2
(45) Date of Patent: Sep. 17, 2024

(54) SYSTEM AND METHOD FOR REST-BASED INTERFACE FOR USE WITH DATA ANALYTICS ENVIRONMENTS

(71) Applicant: Oracle International Corporation, Redwood Shores, CA (US)

(72) Inventors: Sambit Nanda, San Ramon, CA (US); Alan Lee, Minneapolis, MN (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 83 days.

(21) Appl. No.: 17/704,845

(22) Filed: Mar. 25, 2022

(65) Prior Publication Data

US 2023/0080955 A1 Mar. 16, 2023

Related U.S. Application Data

(60) Provisional application No. 63/242,820, filed on Sep. 10, 2021.

(51) Int. Cl.
*G06F 9/54* (2006.01)
(52) U.S. Cl.
CPC ............. *G06F 9/547* (2013.01); *G06F 9/541* (2013.01)
(58) Field of Classification Search
CPC ......... G06F 9/547; G06F 9/541; G06F 16/254
See application file for complete search history.

(56) References Cited

U.S. PATENT DOCUMENTS

| 10,572,315 B1* | 2/2020 | Lusk ..................... G06F 9/541 |
| 2017/0139816 A1* | 5/2017 | Sapozhnikov ...... G06F 11/3664 |
| 2018/0253342 A1* | 9/2018 | Gopalakrishnan ...... G06F 9/541 |
| 2019/0073388 A1* | 3/2019 | Desmarets ............ G06F 16/212 |
| 2019/0317844 A1* | 10/2019 | Gottschlich .............. G06N 3/08 |
| 2019/0332451 A1* | 10/2019 | Tamjidi ................. H04L 63/101 |
| 2020/0012734 A1* | 1/2020 | Lee ..................... G06F 16/2379 |

(Continued)

OTHER PUBLICATIONS

"Administering Oracle Analytics Cloud on Oracle Cloud Infrastructure (Gen 2)—4 Manage Service Access and Security", Jan. 17, 2021, 50 pages, retrieved on Mar. 19, 2024 from: <https://web.archive.org/web/20210117040051/https://docs.oracle.com/en/cloud/paas/analytics-cloud/acoci/manage-service-access-and-security.html#GUID-3DB25824-4417-4981-9EEC-29C0C6FD3883>.

(Continued)

*Primary Examiner* — Kevin L Young
*Assistant Examiner* — Phuong N Hoang
(74) *Attorney, Agent, or Firm* — TUCKER ELLIS LLP

(57) ABSTRACT

In accordance with an embodiment, described herein is a system and method for providing a REST-based interface and connector for use with a data analytics environment, such as, for example, a business intelligence environment, database, data warehouse, or other type of environment that supports data analytics. A data analytics environment can expose a REST connector that can be configured via a user interface, to provide a connectivity layer that works with a range of REST implementations. A user can create and/or configure one or more connections, to support access to data provided by a variety of databases or data sources. The interface and connector establishes a connection to one or more REST endpoints which can be used to access and manipulate data from a variety of cloud applications and platforms, for example SaaS sources, for analytic workloads.

15 Claims, 12 Drawing Sheets

(56) References Cited

U.S. PATENT DOCUMENTS

| | | | |
|---|---|---|---|
| 2020/0159557 A1* | 5/2020 | Pasupathy | H04L 67/1097 |
| 2020/0272670 A1* | 8/2020 | Vaishnavi | G06F 16/958 |
| 2021/0240551 A1* | 8/2021 | Joyce | H04L 67/02 |
| 2021/0349448 A1* | 11/2021 | Hawthorne | G05B 19/4183 |
| 2022/0067024 A1* | 3/2022 | Pethe | G06F 16/2365 |

OTHER PUBLICATIONS

"Administering Oracle Analytics Cloud on Oracle Cloud Infrastructure (Gen 2)—4 Manage Service Access and Security", Jan. 28, 2021, 68 pages, retrieved on Mar. 19, 2024 from: <https://web.archive.org/web/20210128131030/https://docs.oracle.com/en/cloud/paas/analytics-cloud/acoci/manage-service-access-and-security.html#GUID-599E7590-3AB3-41A9-A0A6-24A0FE32F8D6>.

"Oracle Cloud—Administering Oracle Analytics Cloud on Oracle Cloud Infrastructure (Gen 2)", Mar. 2024, 210 pages.

\* cited by examiner

SYSTEM AND METHOD FOR REST-BASED INTERFACE FOR USE WITH DATA ANALYTICS ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application titled "SYSTEM AND METHOD FOR REST-BASED CONNECTOR AND INTERFACE FOR USE WITH DATA ANALYTICS ENVIRONMENTS", Application No. 63/242,820, filed Sep. 10, 2021; which above application and the content thereof is herein incorporated by reference.

TECHNICAL FIELD

Embodiments described herein are generally related to computer data analytics, and computer-based methods of providing business intelligence or other data, and are particularly related to a system and method for providing a REST-based interface and connector for use with a data analytics environment.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In such an environment, applications can expose various functions that enable data extraction via one or more interfaces or APIs. A data analytics customer may seek to consume data from transactional applications, in order to run analytics workloads associated with that data. However, since each particular implementation of an application or data source may present different types of interfaces, objects, and operations such as filters and grouping, this presents a range of implementation differences that hinder access to their associated data.

SUMMARY

In accordance with an embodiment, described herein is a system and method for providing a REST-based interface and connector for use with a data analytics environment, such as, for example, a business intelligence environment, database, data warehouse, or other type of environment that supports data analytics. A data analytics environment can expose a REST connector that can be configured via a user interface, to provide a connectivity layer that works with a range of REST implementations. A user can create and/or configure one or more connections, to support access to data provided by a variety of databases or data sources. The interface and connector establishes a connection to one or more REST endpoints which can be used to access and manipulate data from a variety of cloud applications and platforms, for example SaaS sources, for analytic workloads.

DETAILED DESCRIPTION

Figure 1:
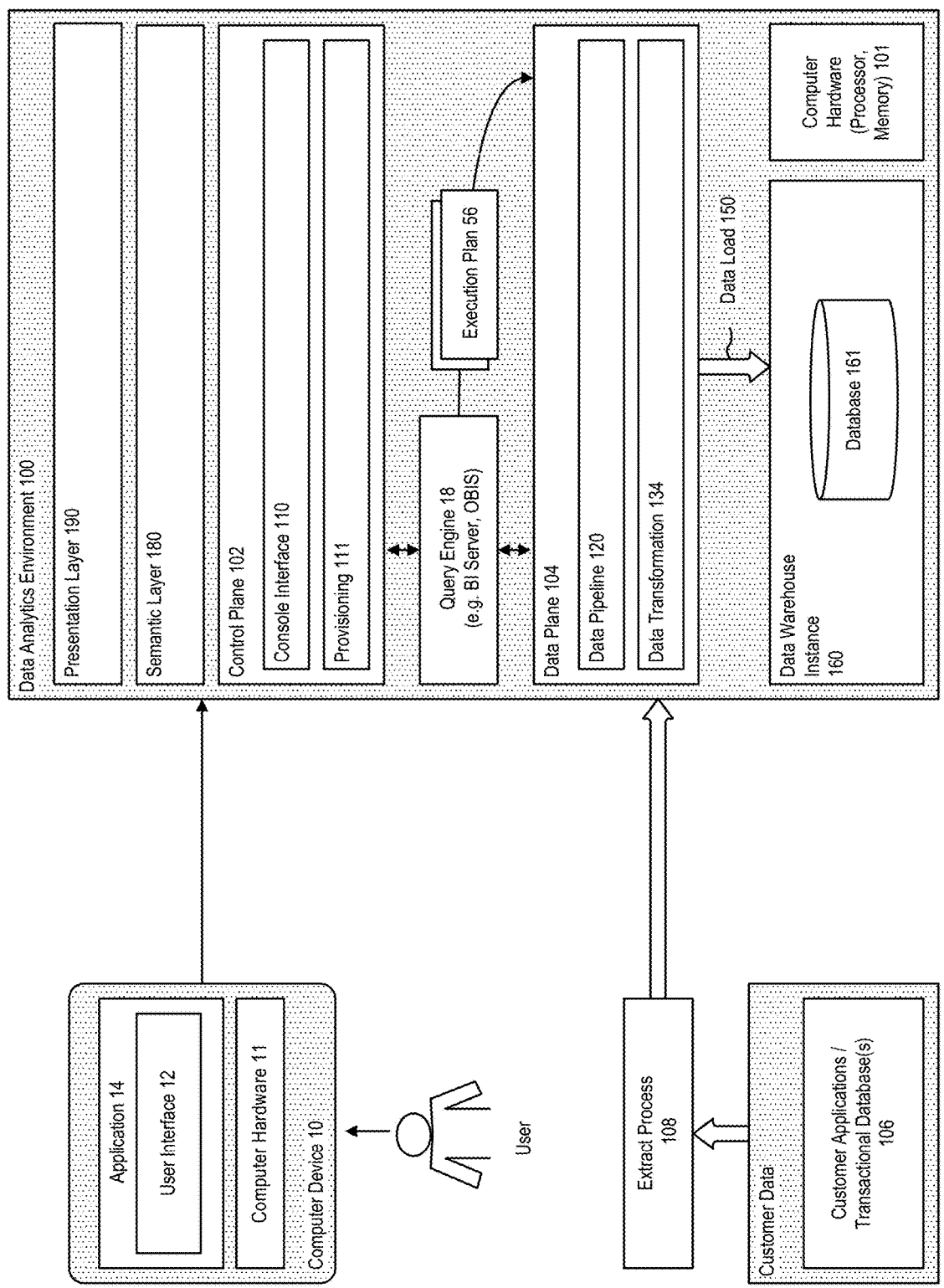
FIG. 1 illustrates an example data analytics environment, in accordance with an embodiment.

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In such an environment, applications can expose various functions that enable data extraction via one or more interfaces or APIs. A data analytics customer may seek to consume data from transactional applications, in order to run analytics workloads associated with that data. However, since each particular implementation of an application or data source may present different types of interfaces, objects, and operations such as filters and grouping, this presents a range of implementation differences that hinder access to their associated data.

In accordance with an embodiment, described herein is a system and method for providing a REST-based interface and connector for use with a data analytics environment, such as, for example, a business intelligence environment, database, data warehouse, or other type of environment that supports data analytics.

In accordance with an embodiment, a data analytics environment can expose a REST connector that can be configured via a user interface, to provide a connectivity layer that works with a range of REST implementations. A user can create and/or configure one or more connections, to support access to data provided by a variety of databases or data sources. The interface and connector establishes a connection to one or more REST endpoints which can be used to access and manipulate data from a variety of cloud applications and platforms, for example SaaS sources, for analytic workloads.

In accordance with various embodiments, additional features can include, for example:

The REST interface can be used to access and manipulate data from a variety of cloud applications and platforms, or establish a connection to a variety of cloud REST endpoints. Data analytics customers can consume data from popular SaaS sources for analytic workloads.

A database or data source driver (e.g., a JDBC driver) can provide a non-endpoint specific interface to connect to REST endpoints. The REST-based connector can operate in a manner such that the user can provide input via a user interface, to provide a connectivity layer that works with a range of REST implementations.

An end-user can extract data from a variety of databases or data sources without having to understand the internal complexities of data format and structure. Operations such as filters and aggregates are shippable to the data source, which helps to avoid pulling in large quantities of data into the data analytics environment itself. The dataset creation workflow can blend or operate with current dataset support workflows.

The REST-based interface and connector framework supports multiple authentication mechanism for each of the REST endpoints. The framework supports creation of REST connector templates that can be downloaded and used directly, without having to provide complex details in the user interface connection screen.

In accordance with an embodiment, a technical advantage of the described systems and methods includes that it provides an approach to accessing data at a variety of applications and/or databases or data sources, including sampling and presenting to an end-user information that allows the user to further define a dataset for use by their particular use case or application, e.g., in generating data analytics or data visualizations.

Data Analytics Environments

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

In accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan 56, that can include various child (leaf) nodes, generally referred to herein in various embodiments as RqLists, and produces one or more diagnostic log entries. Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
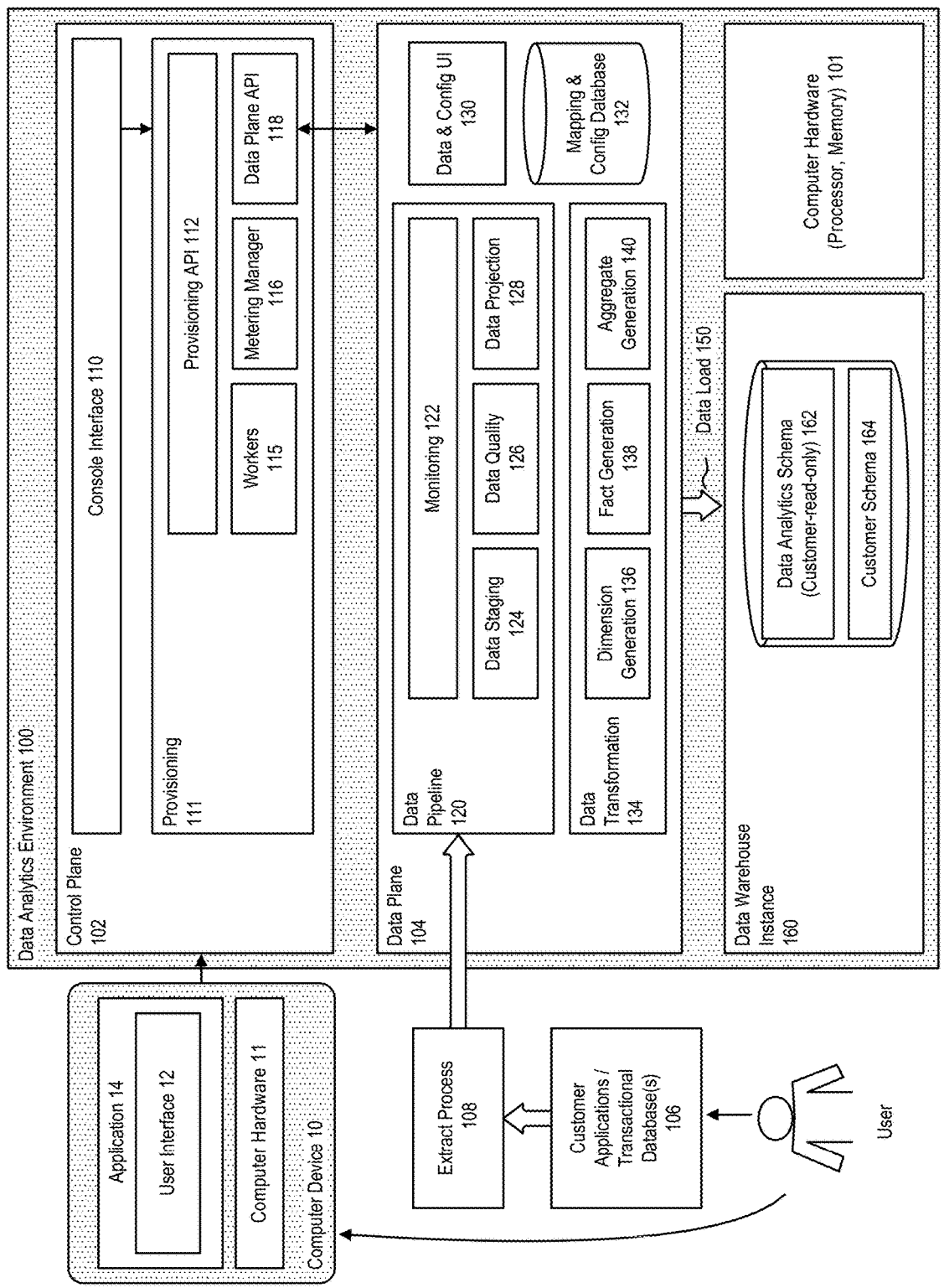
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
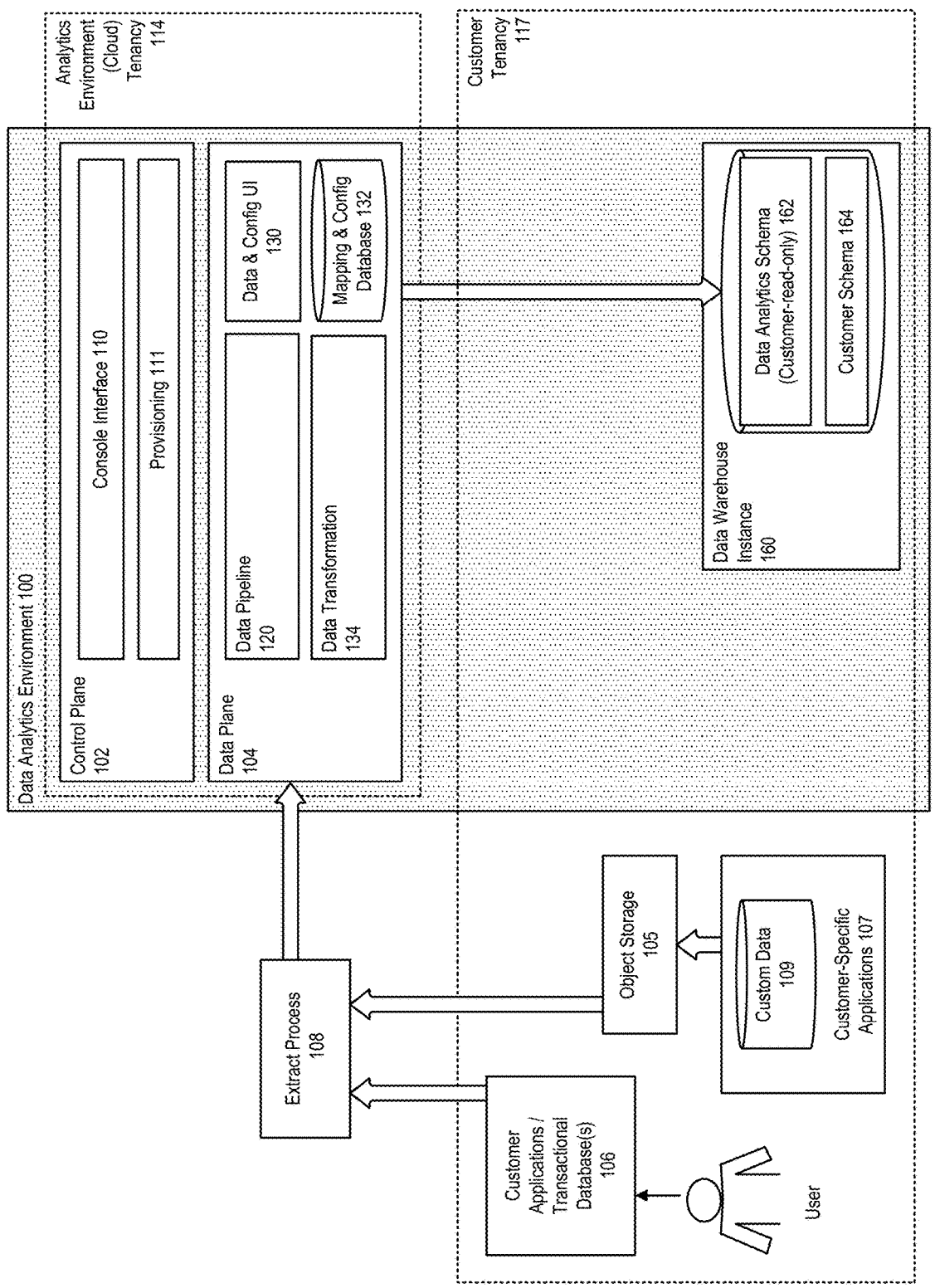
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a data set that uses tables from different connections and schemas. The system uses the relationships defined between these tables to create relationships or joins in the data set.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
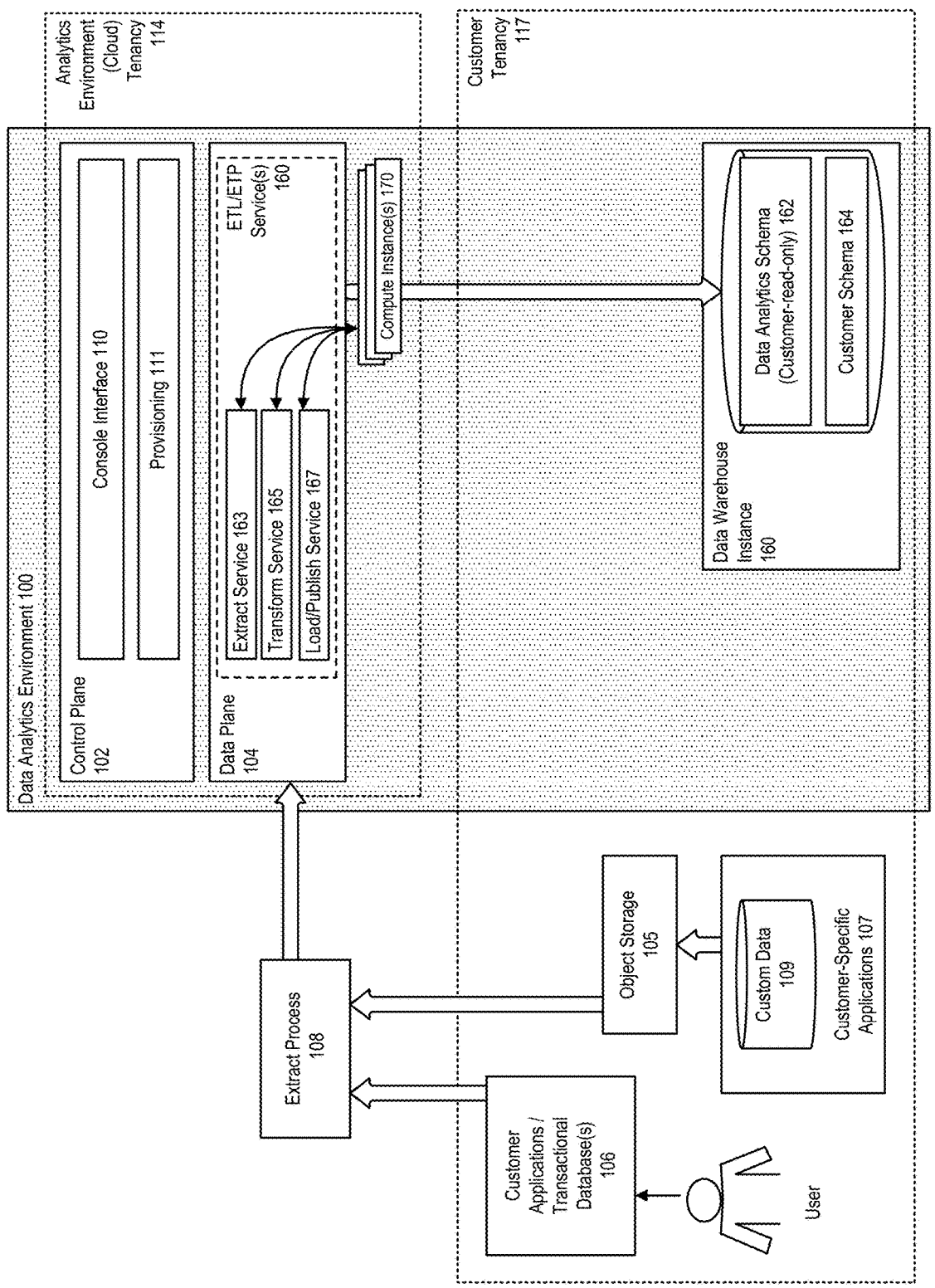
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a ReST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
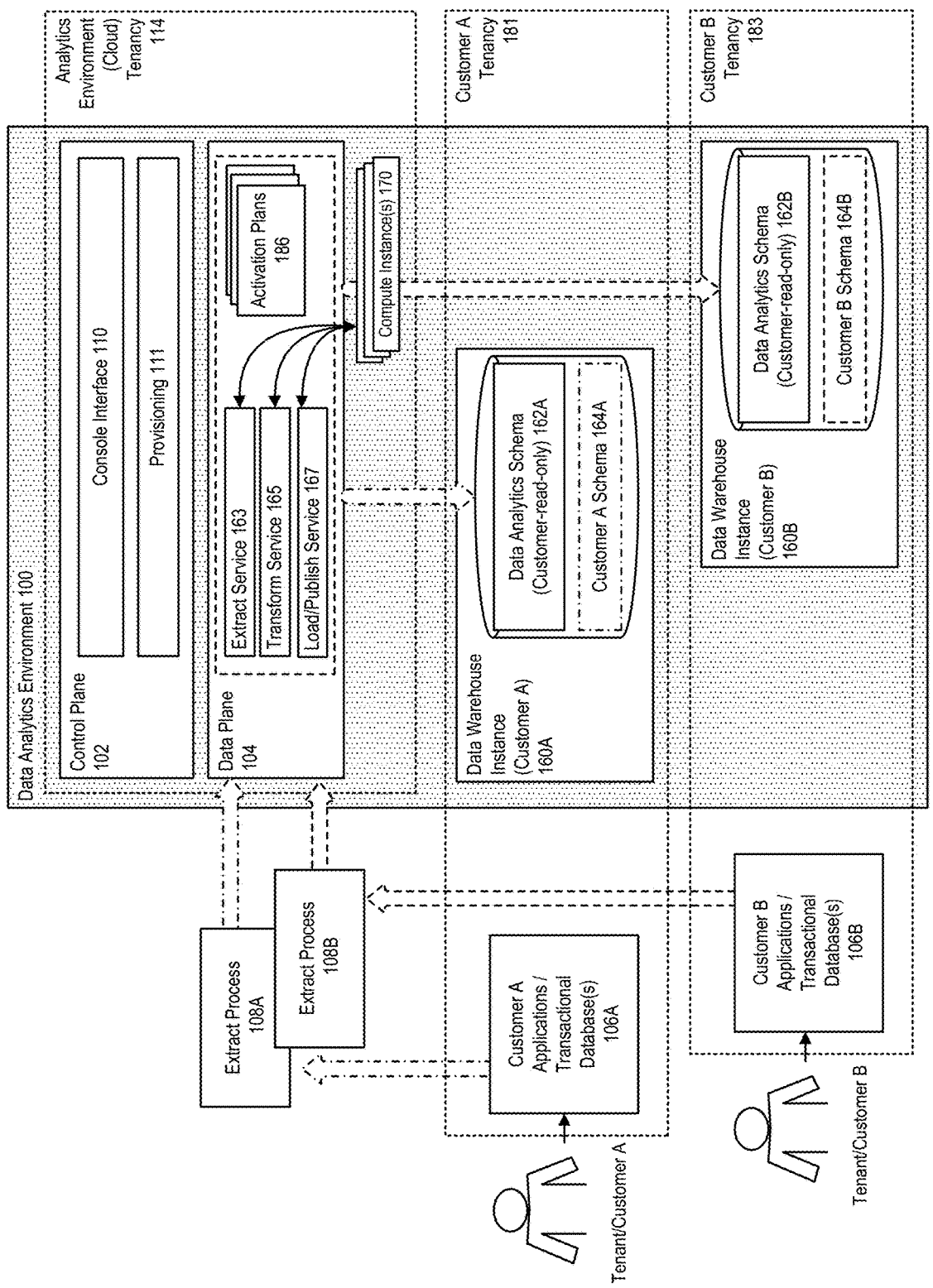
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

REST-based Interface and Connector

In accordance with an embodiment, described herein is a system and method for providing a REST-based interface and connector for use with a data analytics environment, such as, for example, a business intelligence environment, database, data warehouse, or other type of environment that supports data analytics.

In accordance with an embodiment, a data analytics environment can expose a REST connector that can be configured via a user interface, to provide a connectivity layer that works with a range of REST implementations. A user can create and/or configure one or more connections, to support access to data provided by a variety of databases or data sources. The interface and connector establishes a connection to one or more REST endpoints which can be used to access and manipulate data from a variety of cloud applications and platforms, for example SaaS sources, for analytic workloads.

In accordance with various embodiments, additional features can include, for example:

The REST interface can be used to access and manipulate data from a variety of cloud applications and platforms, or establish a connection to a variety of cloud REST endpoints. Data analytics customers can consume data from popular SaaS sources for analytic workloads.

A database or data source driver (e.g., a JDBC driver) can provide a non-endpoint specific interface to connect to REST endpoints. The REST-based connector can operate in a manner such that the user can provide input via a user interface, to provide a connectivity layer that works with a range of REST implementations.

An end-user can extract data from a variety of databases or data sources without having to understand the internal complexities of data format and structure. Operations such as filters and aggregates are shippable to the data source, which helps to avoid pulling in large quantities of data into the data analytics environment itself. The dataset creation workflow can blend or operate with current dataset support workflows.

The REST-based interface and connector framework supports multiple authentication mechanism for each of the REST endpoints. The framework supports creation of REST connector templates that can be downloaded and used directly, without having to provide complex details in the user interface connection screen.

Figure 6:
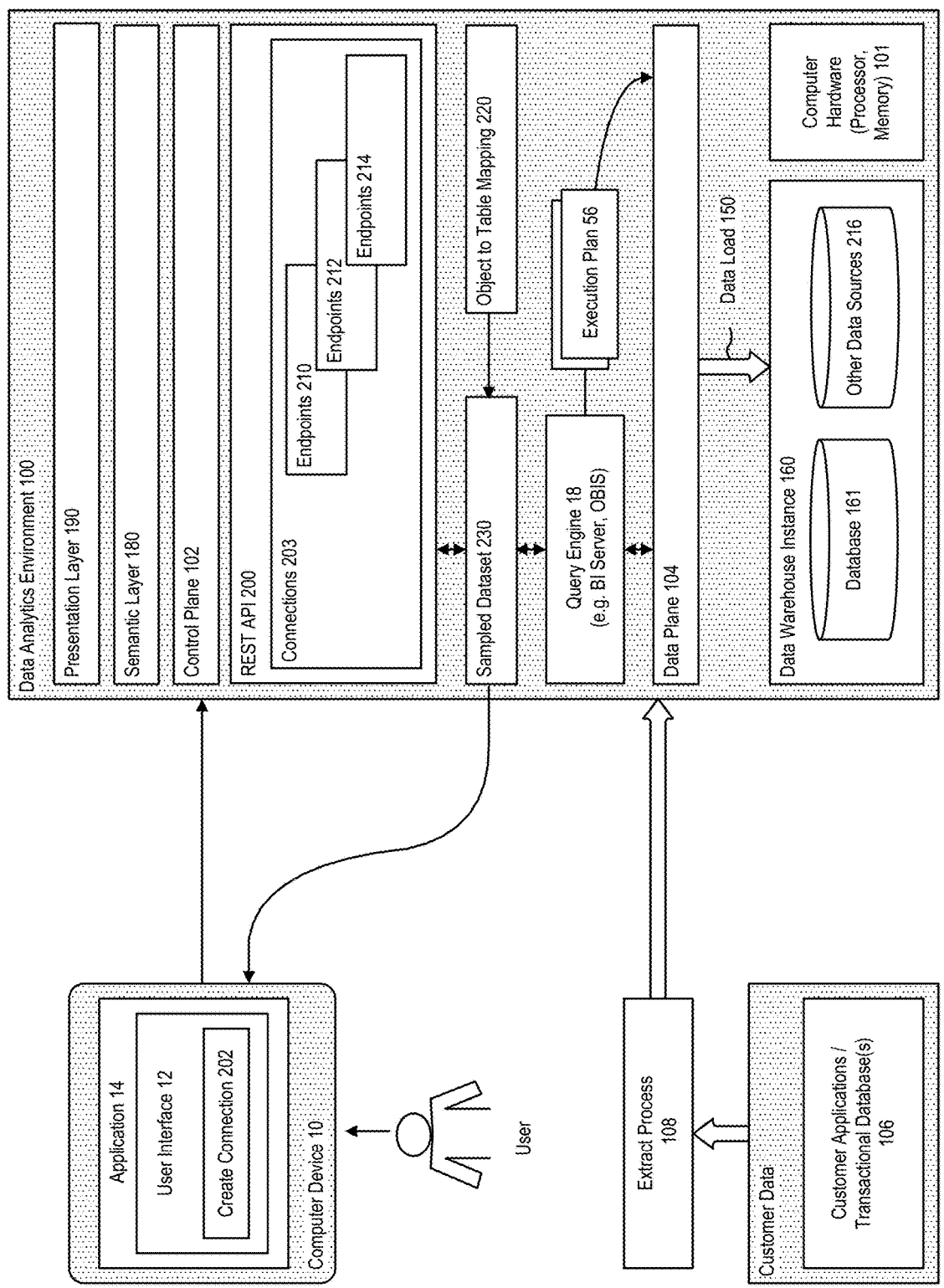
FIG. 6 illustrates the use of a REST-based interface with a data analytics environment, in accordance with an embodiment.

FIG. 6 illustrates the use of a REST-based interface with a data analytics environment, in accordance with an embodiment.

As illustrated in FIG. 6, in accordance with an embodiment, a REST-based interface (API) and associated connector 200 enables a user to create and/or configure, for example via an Oracle Analytics Cloud or other analytics environment user interface, one or more connections 203, to support access to data provided by a variety of databases (e.g., database 161) or other data sources 216. The interface and connector establishes a connection to one or more REST endpoints 210, 212, 214, which can be used to access and manipulate data from a variety of cloud applications and platforms, for example SaaS sources, for analytic workloads.

As further illustrated in FIG. 2, in accordance with an embodiment, the REST-based interface and connector can provide, for a particular connection, an object-to-table mapping 220, for example between a JSON object specified by a user, and table rows and columns of data provided by the database or data source.

In accordance with an embodiment, the system allows the database or data source to be sampled according to the configuration of the connection, to provide a sampled dataset 230, for display at the user interface or further review by the user.

Creation and Configuration of Connections

Figure 7:
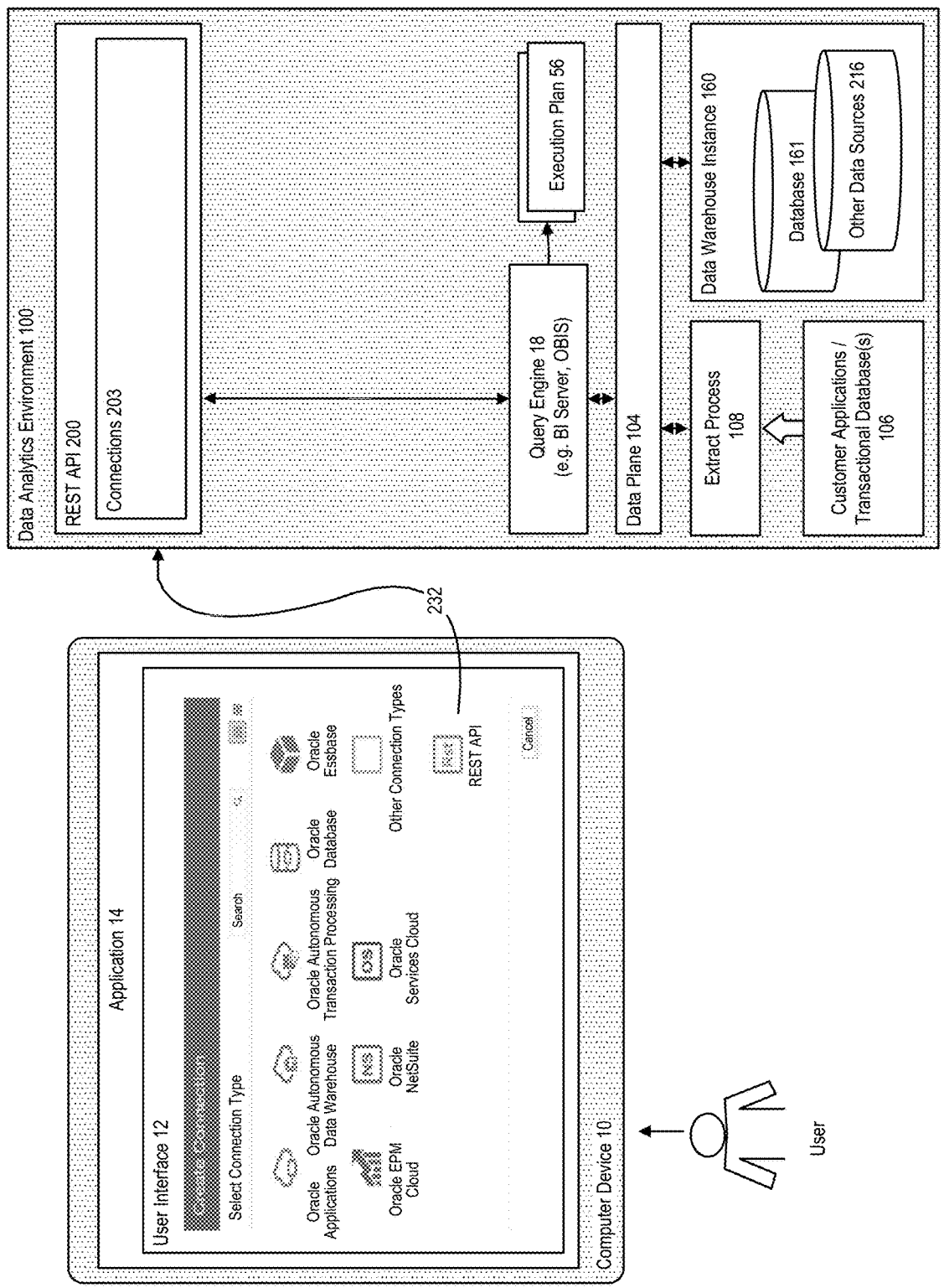
FIG. 7 further illustrates the use of a REST-based interface with a data analytics environment, including various user interfaces, in accordance with an embodiment.
Figure 8:
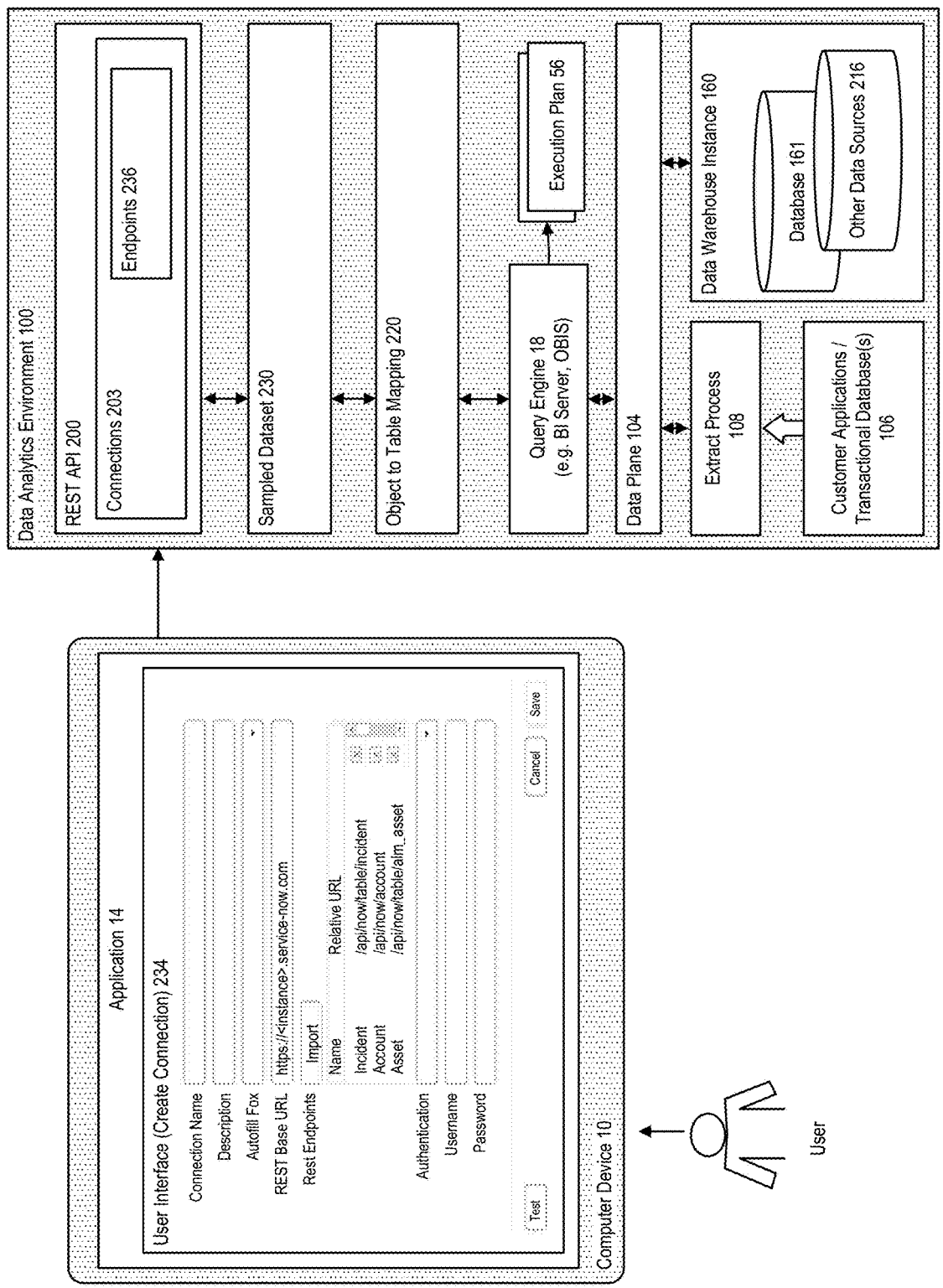
FIG. 8 further illustrates the use of a REST-based interface with a data analytics environment, including an example JSON-to-table mapping, in accordance with an embodiment.

FIGS. 7-8 further illustrate the use of a REST-based interface with a data analytics environment, including various user interfaces, in accordance with an embodiment.

As illustrated in FIG. 7, in accordance with an embodiment, the system provides different methods for the user to create a connection to one or more REST endpoints which can be used to access and manipulate data from a variety of cloud applications and platforms, for example SaaS sources, for analytic workloads.

As illustrated in FIG. 8, in accordance with an embodiment, a first approach to creating a connection is to use an, e.g., "Upload" or "Import" option provided within the user interface 234, to upload or import a zip or other-format file that populates the fields in a connection creation dialogue. The zip file can include a JSON document or other means of specifying an, e.g., JSON object.

In accordance with an embodiment, additional objects of information can be included in the zip file, for example a digital certificate to decrypt encrypted credentials.

An alternative approach to creating a connection allows the user to complete a connection creation dialogue within the user interface, and provide the necessary endpoint information for the system to create a connection, including, for example: a base URL, or common portion of the URL that will be appended with the object reference paths; one or more endpoints 236, or objects mapped to an endpoint response URL which will serve the response objects; and optionally authentication details, for example, an authentication type selection for creating a connection.

Using either of the above approaches, an appropriate REST connector can be configured, for example as Illustrated below:

```
{
  "Rest Connector" : "1.0"
  [
    {
      "Name" : "<connection-name>",
      "Description": "Any text"
      "BaseURL" : "<http(s) path to the base url>",
      "Endpoints" : {
        "object1" : "relative path of http(s) endpoint"
        "object2" : "relative path of http(s) endpoint"
      }
      "Authentication" :
        {
          "Type" : "Basic"
          "Username": "Username"
        }
    }
  ]
}
```

In accordance with an embodiment, multiple connectors can be specified for a particular data source, to address the particular use case; and different use cases or applications can access a data source at different endpoints. The below example illustrates the configuration of a REST connector for use with for example, a database or data source of business reviews.

```
{
  "Rest Connector" : "1.0"
  [
    {
      "Name" : "Business Reviews",
      "Description": "Rest connection to business review site"
      "BaseURL" : "https://api.reviews.com/v3",
      "Endpoints" : {
        "events" : "/events"
        "categories" : "/categories"
        "business" : "/businesses/search?location=27617"
      }
      "Authentication" :
        {
          "Type" : "Basic"
          "Username": "Username"
        }
    }
```

```
  }
  ]
}
```

JSON-to-Table Mapping

In accordance with an embodiment, the system operates so that, on first connect by the analytics environment to the database or data source associated with a configured connection, the database driver samples and creates nested flattened objects mapped to parent tables. Arrays of objects and arrays of strings are mapped to related child tables, for example using PK and generated composite keys. The driver uses the input REST file supplied and produces an output REST mapping file based on sampling and predefined policies around PK and Datatypes.

Figure 9:
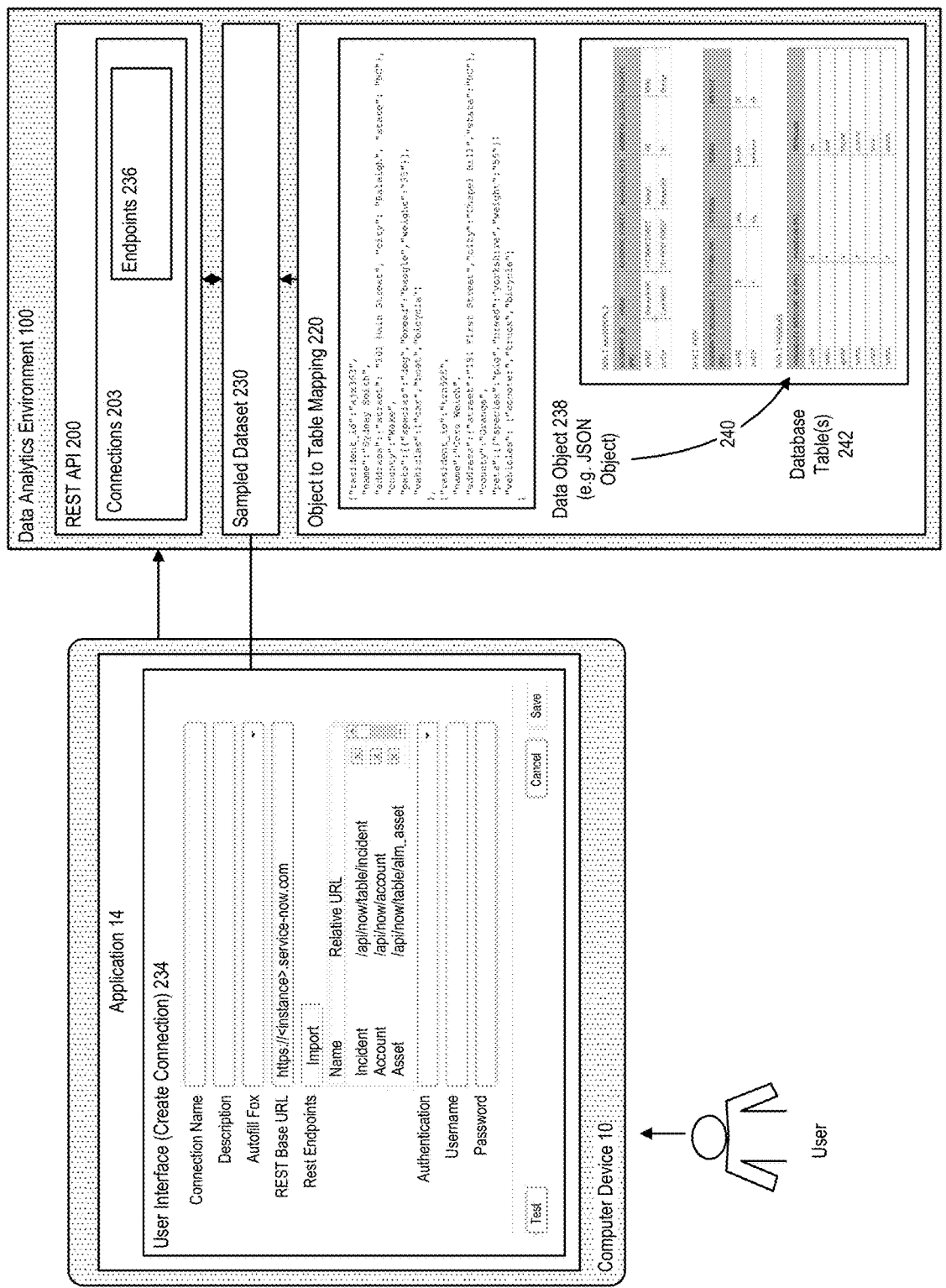
FIG. 9 further illustrates the use of a REST-based interface with a data analytics environment, including an example JSON-to-table mapping, in accordance with an embodiment.
Figure 10:
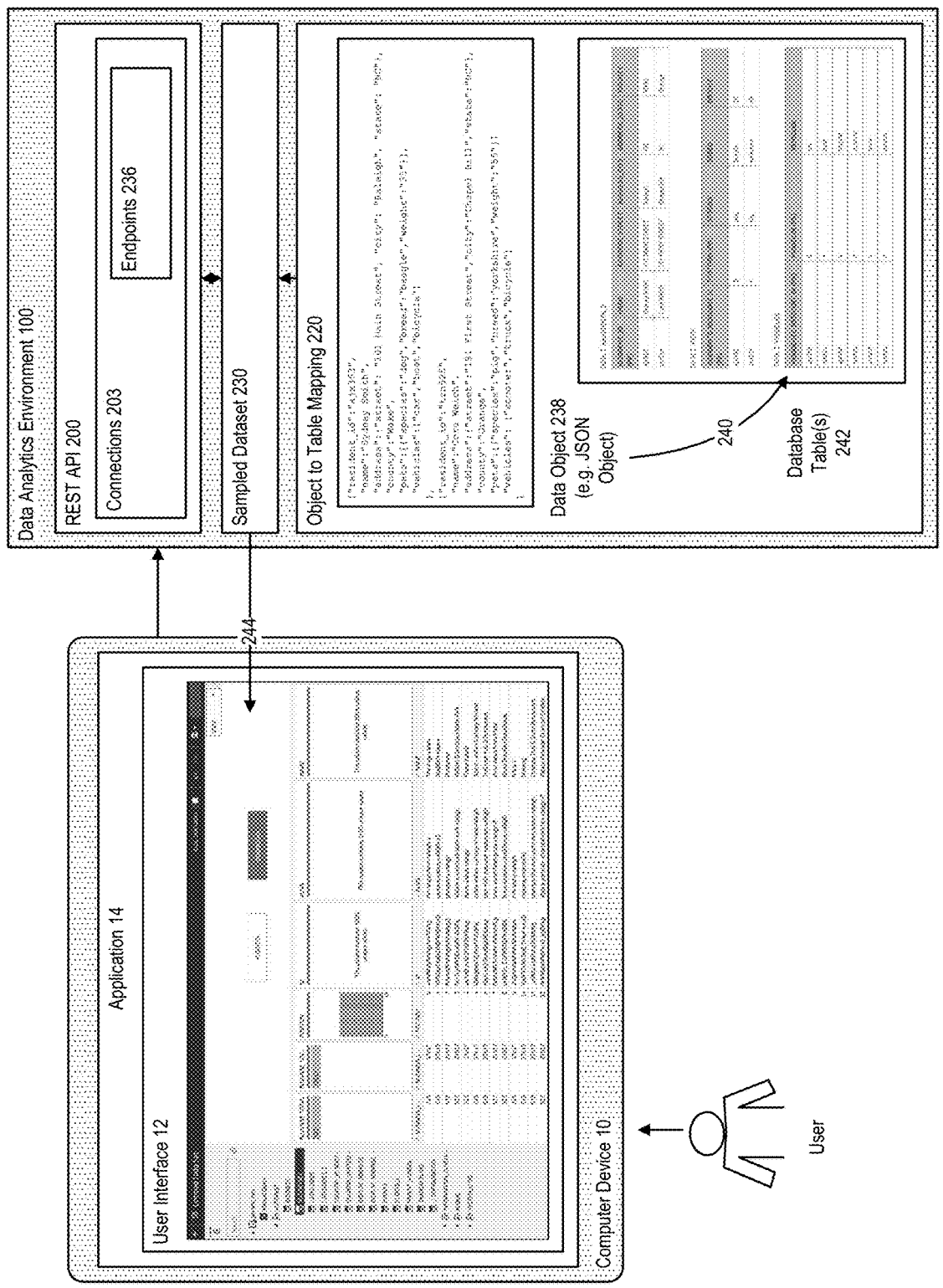
FIG. 10 further illustrates the use of a REST-based interface with a data analytics environment, including an example JSON-to-table mapping, in accordance with an embodiment.

FIGS. 9-10 further illustrates the use of a REST-based interface with a data analytics environment, including an example JSON-to-table mapping, in accordance with an embodiment.

As illustrated in FIG. 9, in accordance with an embodiment, the REST-based interface and connector can provide, for a particular connection, an object-to-table mapping 240, for example between 240 a JSON object 238 specified by a user, and table 242 rows and columns of data provided by the database or data source.

In accordance with an embodiment, an output REST file (query runtime file) can be persisted in memory or on disk. The frequency of the creation of this file can be controlled (for example, every session, or only when not available). Directives to generate an output REST mapping of tables to objects can be specified by specific directives in an input REST file.

Example (JSON) data object:

```
{"resident id":"ajx363",
  "name":"Sydney Smith",
  "addressstreet": "101 Main Street", "city": "Raleigh", "state": "NC"),
  "county":"Wake",
  "pets":[{"species":"dog","breed":"beagle","weight":"35")],
  "vehicles":["car","boat","bicycle"]
},
{"resident_id":"tzn525",
  "name":"Cora Welch",
  "address":{"street":"191 First Street","city":"Chapel Hill","state": "NC"),
  "county":"Orange",
  "pets":[{"species":"pig","breed":"yorkshire","weight":"55")]
  "vehicles": ["scooter","truck","bicycle"]
}
```

In accordance with an embodiment, arrays of objects and arrays of strings can be normalized into a plurality of tables, as illustrated in the examples below using PK and POSITION column in the derived table.

TABLE 1

| | | | RESIDENTS_2 | | |
|---|---|---|---|---|---|
| RESIDENT_ID (PK) | NAME | ADDRESS_ STREET | ADDRESS_CITY | ADDRESS_ STATE | COUNTY |
| ajx63 | Sydney Smith | 101 MAIN STREET | Raleigh | NC | Wake |
| tzn25 | Cora Welch | 191 FIRST STREET | Chapel Hill | NC | Orange |

TABLE 2

| | | PETS | | |
|---|---|---|---|---|
| RESIDENTS_ RESIDENT_ID (PK) | POSITION (PK) | SPECIES | BREED | WEIGHT |
| ajx63 | 0 | dog | beagle | 35 |
| tzn25 | 0 | pig | Yorkshire | 55 |

TABLE 3

| | VEHICLES | |
|---|---|---|
| RESIDENTS_ RESIDENT_ID (PK) | POSITION (PK) | VEHICLES |
| ajx63 | 0 | car |
| ajx63 | 1 | boat |
| ajx63 | 2 | bicycle |
| tzn25 | 0 | scooter |
| tzn25 | 1 | truck |
| tzn25 | 2 | bicycle |

In accordance with various embodiments and use cases, the system can use JSON-to-table mapping workflows into, for example, OAC-native user interfaces. These workflows allow a user to select a specific object and array and form derived tables with join/keys defined.

In accordance with various embodiments, the system can specify and map JSON structure returned from the REST endpoint; and to branch out smaller tables from any large JSON file and create a dataset per table, or sub-tables generated through the above process. Some of the tables can have derived columns to create composite keys to maintain the unique constraints across the parent and child tables.

As illustrated in FIG. 10, in accordance with an embodiment, a sampled dataset can be provided 244 for display at the user interface or further review by the user.

Dataset Creation Workflow

In accordance with an embodiment, once the connection has been configured as described above, the interface and connector establishes a connection to one or more REST endpoints which can be used to access and manipulate data from a variety of cloud applications and platforms, for example SaaS sources, for analytic workloads.

Figure 11:
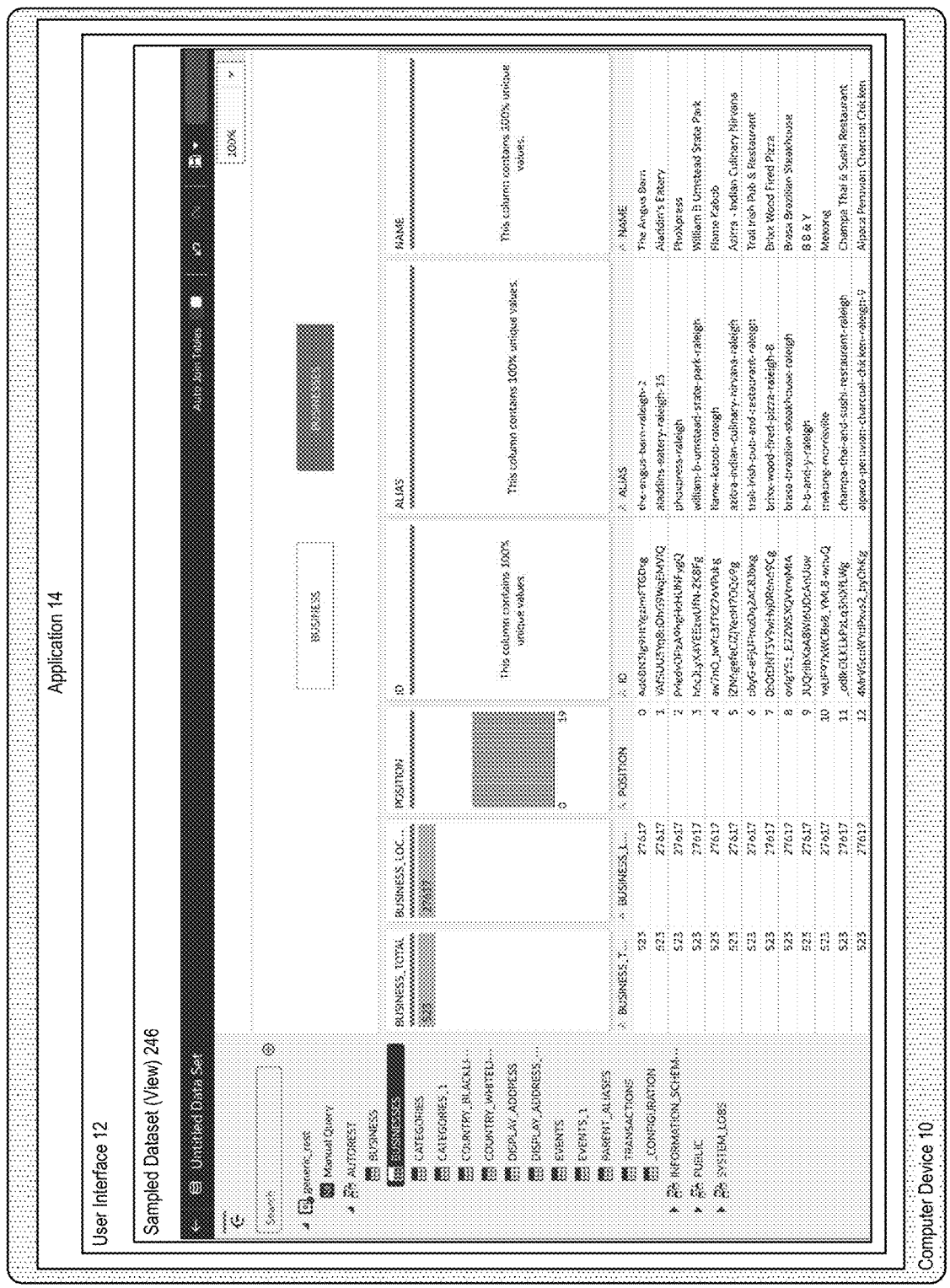
FIG. 11 further illustrates the use of a REST-based interface with a data analytics environment, including an example user interface displaying a dataset, in accordance with an embodiment.

FIG. 11 further illustrates the use of a REST-based interface with a data analytics environment, including an example user interface displaying a dataset, in accordance with an embodiment.

In accordance with an embodiment, the system allows the database or data source to be sampled according to the configuration of the connection, to provide a sampled dataset, for display at the user interface or further review by the user.

For example, in accordance with an embodiment, the system can establish the connection to the REST endpoint and all the endpoints (e.g., "/categories", "/businesses") listed in the connection object, and sample the corresponding data, for example by a Data Direct, JDBC, or other type of database driver. Data at REST endpoints returned as JSON documents are flattened out into table objects by the driver based on sampling.

As described above, in accordance with an embodiment, a sampled dataset can be provided for display at the user interface or further review by the user.

For example, as illustrated in FIG. 11, in accordance with an embodiment, a flattened table list can be presented to an OBIS or Data Visualization (DV) environment as tables, for use in creating visualizations. Tables can be presented under a predefined schema name "AUTOREST"; with endpoints that have versions example/v1/categories show up as table names with postfix. Once the driver flattens the JSON document into tables—the associate XSA metadata looks similar to other relational tables understood by the system, and can be examiner using, for example logical SQL (LSQL) queries.

Figure 12:
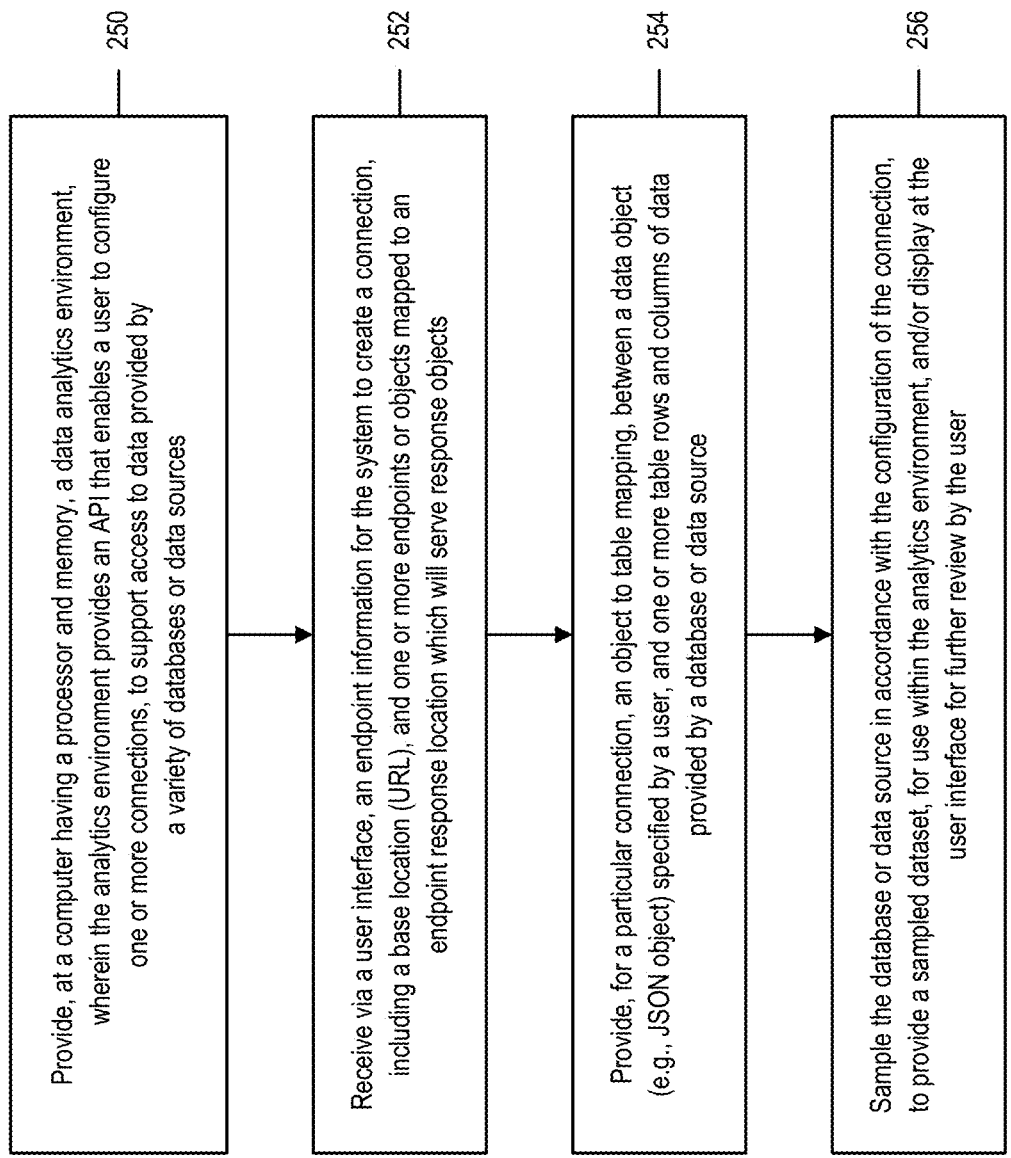
FIG. 12 illustrates a process or method for use of a REST-based interface with a data analytics environment, in accordance with an embodiment.

FIG. 12 illustrates a process or method for use of a REST-based interface with a data analytics environment, in accordance with an embodiment.

As illustrated in FIG. 12, in accordance with an embodiment, at step 250, at a computer having a processor and memory, a data analytics environment is provided, wherein the analytics environment provides an API that enables a user to configure one or more connections, to support access to data provided by a variety of databases or data sources.

At step 252, the system can receive via a user interface, an endpoint information for the system to create a connection, including a base location (URL), and one or more endpoints or objects mapped to an endpoint response location which will serve response objects.

At step 254, the system provides, for a particular connection, an object-to-table mapping, between a data object (e.g., JSON object) specified by a user, and one or more table rows and columns of data provided by a database or data source.

At step 256, the system can sample the database or data source in accordance with the configuration of the connection, to provide a sampled dataset, for use within the analytics environment, and/or display at the user interface for further review by the user.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of a data analytics environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing a REST-based interface and connector for use with a data analytics environment, comprising:
   a computer having a processor, memory, and data analytics environment operating thereon;
   wherein the data analytics environment exposes a connector that can be is configured via a user interface, wherein a user creates and/or configures one or more connections, to support access, via a configurable data object, to data provided by a variety of databases or data sources, including receiving as input a configuration comprising:
   a base uniform resource locator (URL); and
   one or more endpoints mapped to an endpoint response URL;
   wherein the system establishes a configured connection to the one or more endpoints which are used to access and manipulate data provided by the databases or data sources based on the received configuration including:
   connecting to a database or data source associated with the configured connection, and sampling and creating nested flattened objects mapped to parent tables and child tables;
   generating for use with the data object, an object-to-table mapping operating between the data object and table rows and columns of data provided by the database or data source; and
   providing access via the data object to the table rows and columns of data provided by the database or data source, for use with an analytics workload of the data analytics environment.

2. The system of claim 1, wherein the system provides a connection creation dialogue within the user interface, enabling the user to provide necessary endpoint information for the system to create a connection, including the base URL, and the one or more endpoints mapped to the endpoint response URL which will serve response objects.

3. The system of claim 1, wherein the REST-based interface and connector provides, for a particular connection, an object-to-table mapping between a JavaScript Object Notation (JSON) object specified by the user and the table rows and columns of data provided by the database or data source.

4. The system of claim 1, wherein the system allows the database or data source to be sampled according to the configuration of the connection, to provide a sampled dataset, for display at the user interface for further review by the user.

5. The system of claim 1, wherein the REST-based interface and connector establish connections to one or more REST endpoints that are used to access data at one or more cloud applications or data sources for use with analytic workloads.

6. A method for providing a REST-based interface and connector for use with a data analytics environment, comprising
   providing, at a computer system having a processor and memory, a data analytics environment;
   wherein the data analytics environment exposes a connector that is configured via a user interface, wherein a user creates and/or configures one or more connections, to support access, via a configurable data object, to data provided by a variety of databases or data sources, including receiving as input a configuration comprising:
   a base uniform resource locator (URL); and
   one or more endpoints mapped to an endpoint response URL;
   wherein the system establishes a configured connection to the one or more endpoints which are used to access and manipulate data provided by the databases or data sources based on the received configuration including:
   connecting to a database or data source associated with the configured connection, and sampling and creating nested flattened objects mapped to parent tables and child tables;
   generating for use with the data object, an object-to-table mapping operating between the data object and table rows and columns of data provided by the database or data source; and
   providing access via the data object to the table rows and columns of data provided by the database or data source, for use with an analytics workload of the data analytics environment.

7. The method of claim 6, wherein the system provides a connection creation dialogue within the user interface, enabling the user to provide necessary endpoint information for the system to create a connection, including the base URL, and the one or more endpoints mapped to the endpoint response URL which will serve response objects.

8. The method of claim 6, wherein the REST-based interface and connector provides, for a particular connection, an object-to-table mapping between a JavaScript Object Notation (JSON) object specified by the user and the table rows and columns of data provided by the database or data source.

9. The method of claim 6, wherein the system allows the database or data source to be sampled according to the configuration of the connection, to provide a sampled dataset, for display at the user interface for further review by the user.

10. The method of claim 6, wherein the REST-based interface and connector establish connections to one or more REST endpoints that are used to access data at one or more cloud applications or data sources for use with analytic workloads.

11. A non-transitory computer readable storage medium having instructions thereon, which when read and executed by a computer including one or more processors cause the computer to perform a method comprising:

providing, at a computer system having a processor and memory, a data analytics environment;

wherein the data analytics environment exposes a connector that can be is configured via a user interface, wherein a user creates and/or configures one or more connections, to support access, via a configurable data object, to data provided by a variety of databases or data sources, including receiving as input a configuration comprising:

a base uniform resource locator (URL); and one or more endpoints mapped to an endpoint response URL;

wherein the system establishes a configured connection to the one or more endpoints which are used to access and manipulate data provided by the databases or data sources based on the received configuration including:

connecting to a database or data source associated with the configured connection, and sampling and creating nested flattened objects mapped to parent tables and child tables;

generating for use with the data object, an object-to-table mapping operating between the data object and table rows and columns of data provided by the database or data source; and providing access via the data object to the table rows and columns of data provided by the database or data source, for use with an analytics workload of the data analytics environment.

12. The non-transitory computer readable storage medium of claim 11, wherein the system provides a connection creation dialogue within the user interface, enabling the user to provide necessary endpoint information for the system to create a connection, including the base URL, and the one or more endpoints mapped to the endpoint response URL which will serve response objects.

13. The non-transitory computer readable storage medium of claim 11, wherein the REST-based interface and connector provides, for a particular connection, an object-to-table mapping between a JavaScript Object Notation (JSON) object specified by the user and the table rows and columns of data provided by the database or data source.

14. The non-transitory computer readable storage medium of claim 11, wherein the system allows the database or data source to be sampled according to the configuration of the connection, to provide a sampled dataset, for display at the user interface for further review by the user.

15. The non-transitory computer readable storage medium of claim 11, wherein the REST-based interface and connector establish connections to one or more REST endpoints that are used to access data at one or more cloud applications or data sources for use with analytic workloads.

* * * * *

UNITED STATES PATENT AND TRADEMARK OFFICE
CERTIFICATE OF CORRECTION

PATENT NO. : 12,093,757 B2
APPLICATION NO. : 17/704845
DATED : September 17, 2024
INVENTOR(S) : Nanda et al.

Page 1 of 1

It is certified that error appears in the above-identified patent and that said Letters Patent is hereby corrected as shown below:

In the Specification

In Column 10, Line 39, delete "ReST" and insert -- REST --, therefor.

In the Claims

In Column 17, Line 47, in Claim 1, delete "can be is" and insert -- is --, therefor.

Signed and Sealed this
Seventh Day of January, 2025

Derrick Brent
*Acting Director of the United States Patent and Trademark Office*